April 2, 1963  W. B. BEUHLER  3,083,483
AUTOMATIC PARKING CONTROL DEVICE
Filed March 11, 1960  2 Sheets-Sheet 1
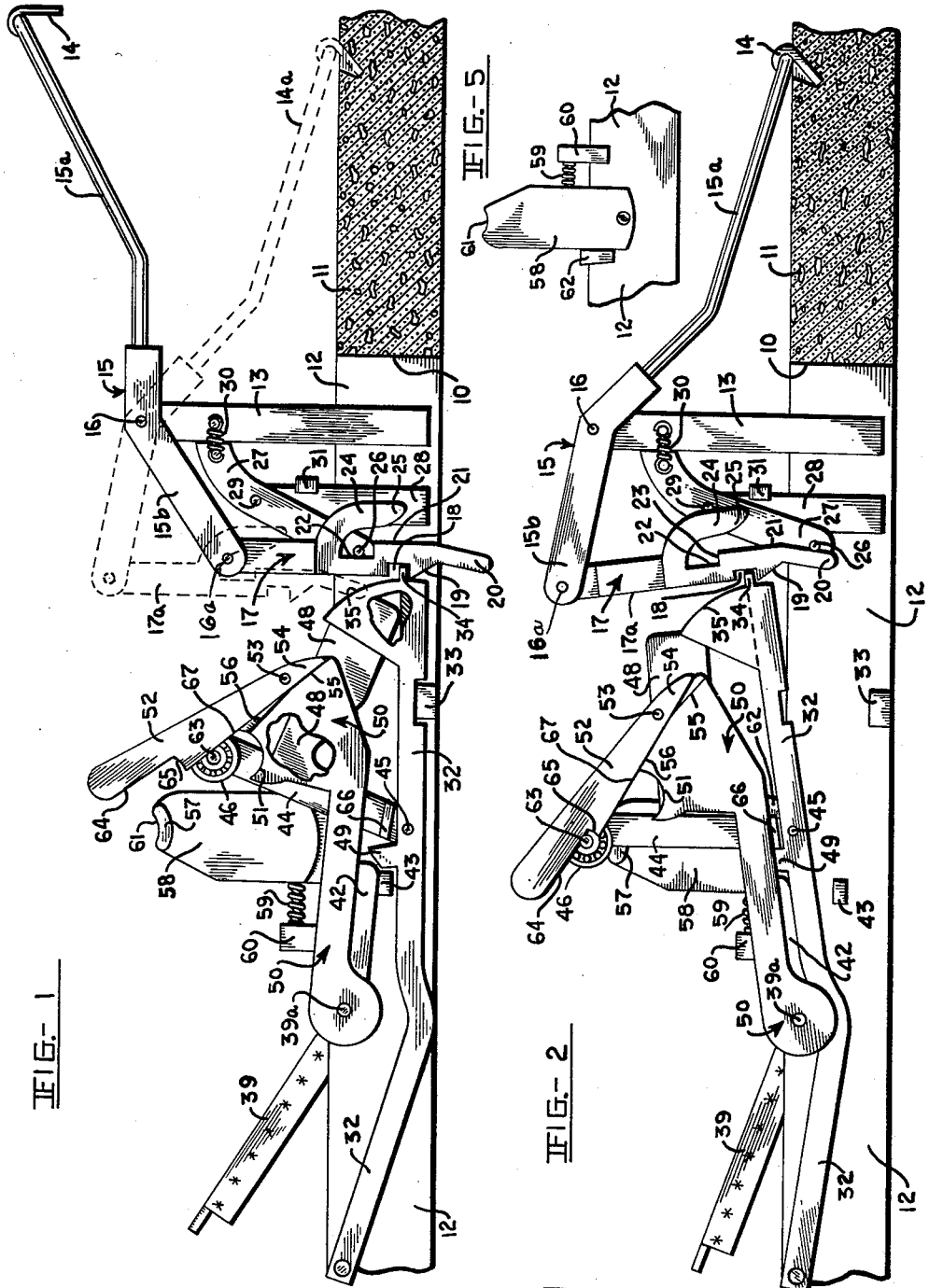
INVENTOR
WILLIAM B. BEUHLER
BY Herbert A. [illegible]
ATTORNEY April 2, 1963 W. B. BEUHLER 3,083,483
AUTOMATIC PARKING CONTROL DEVICE
Filed March 11, 1960 2 Sheets-Sheet 2
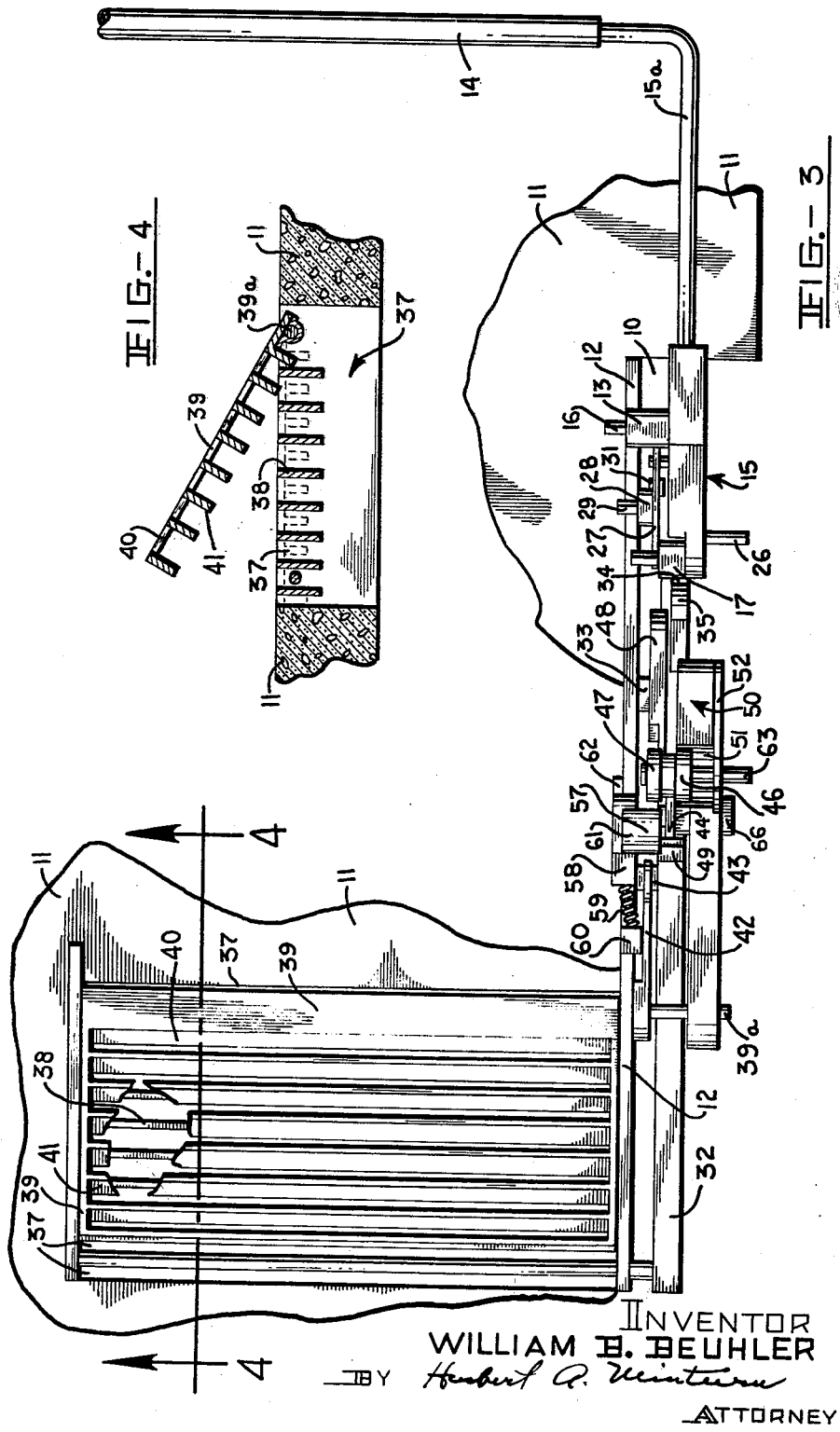
INVENTOR
WILLIAM B. BEUHLER
BY Herbert A. Minturn
ATTORNEY

United States Patent Office 3,083,483
Patented Apr. 2, 1963

3,083,483
AUTOMATIC PARKING CONTROL DEVICE
William B. Beuhler, 315 Vine St., Marshall, Ill.
Filed Mar. 11, 1960, Ser. No. 14,381
8 Claims. (Cl. 39—6)

This invention relates to a mechanism for controlling the entrance of a vehicle either into a parking lot or into individual stalls in the lot. Normally the mechanism is set in a barrier condition to prevent entrance of vehicles, and the barrier is automatically dropped or removed upon operation of any suitable means such as a coin operating means or by a manual control actuated by the parking lot attendant. The mechanism is herein shown without a coin controlled mechanism, particularly for the sake of simplicity in describing and illustrating the invention.

Following the removal of the barrier, the vehicle may proceed and run over a treadle to lower the treadle, and set the control mechanism in condition for a subsequent operation by a rear wheel of the vehicle following the traversing of the treadle with the front wheel, whereby the barrier will be positioned in the barrier or vehicle stop indication.

A primary purpose of the invention is to provide an exceedingly simple yet very rugged device which is operable in all kinds of rugged weather whether it be warm, cold, stormy, or freezing, and will be substantially "foolproof." Outside of the treadle and the barrier the entire control mechanism may be provided with a protective housing or covering. The mechanism is primarily above the level of the parking area and located to one side of the driveway for the vehicle.

A further important purpose of the invention is to provide a mechanism of the nature above indicated, wherein but a single attendant may be required on the parking lot in case the device is to be manually operated, and where a coin controlled device is employed, it is possible to dispense with all attendants.

An excellent place for use of the invention is on toll roads particularly at the access zone so as to admit a vehicle only after it has stopped and then may proceed. Drive-in theaters also offer a place for good use of this invention.

While the mechanism constituting the present invention to be described herein is shown without any coin device or tabulating device, it is within the province of the installation of the mechanism to provide a tabulating machine which will indicate the number of vehicles traversing the control, and upon a "full" parking lot condition indicate in the incoming drive the fact that the lot is entirely filled.

These and many other objects and advantages of the invention will become apparent to those versed in the art in the following description of one particular form of the structure embodying the invention as illustrated in the accompanying drawings, in which FIG. 1 is a view in side elevation of a structure embodying the invention shown in a normal barrier raised condition and in conjunction with a parking floor in partial section;

FIG. 2 is a similar view with the barrier dropped to permit vehicle travel past the mechanism;

FIG. 3 is a view in top plan of the mechanism with parts of the rockable treadle broken away to distinguish clearly underlying fixed grill bars;

FIG. 4 is a view in vertical section on the line 4—4 in FIG. 3 through the re-set treadle and vehicle supporting grille, and FIG. 5 is an enlarged detail in rear elevation of a rockable, bearing receiving post.

Within a recess 10 in the floor 11 of the parking lot is positioned and fixed a supporting member 12 to hold the mechanism. This member 12 may assume any desired shape, herein shown as being a rectangular bar.

Toward one end of the bar 12, at the vehicle entrance directed end, is fixed to the bar 12 a post 13 rising above the level of the floor 11. A barrier 14 is carried on a lever generally designated by the numeral 15, this lever 15 in turn being rockably supported on the upper end portion of the post 13 by any suitable means, such as by the pin 16. The barrier 14 is fixed substantially at right angles to the extension 15a of the lever 15, this length and the weight of the barrier 14 itself being sufficient to normally permit the barrier 14 to rock the lever 15 and drop the barrier 14 to the floor 11. This barrier 14 is made in any desirable form, preferably of sufficient vertical height to carry a legend of information to the oncoming vehicle.

A latch member 17 is rockably attached by a pin 16a to the arm 15b of the lever 15 to hang normally downwardly from the end portion of that arm 15b. In the free position, the member 17 would assume that position as indicated in dash lines, FIG. 1.

The lower end of the member 17 has, on the left hand side, as viewed in the drawings, an entering rectangular notch 18. The member 17 extends below the notch by a sloping face 19 extending from immediately below the notch at the left hand side of the member 17, this sloping surface 19 extending downwardly and to the right, to a finger 20 which extends downwardly therefrom, which finger 20 is inclined to the left below the lower end of the surface 19. The right hand side of this finger 20 slopes upwardly and to the right to merge into the back face 21 of the member 17.

A notch 22 enters from the face 21 having a lower end portion 23 at an elevation above the upper end of the notch 18 on the other side. A guard 24 extends to the right from the face 21 and thence downwardly to a lower end 25 spaced below the notched surface 23, to provide a clearance between the end 25 and the face 21 opening under the guard member 24 into the notch 22. The face of the guard member 24 directed toward the face 21 rounds outwardly around the lower end to the right.

A barrier release member herein shown in the nature of a pin or post 26 is fixed to a rocker 27 rockably supported by a post 28 spaced to the left of the barrier supporting post 13. This rocker 27 is pivoted by the pin 29 to the post 28, and extends therebeyond upwardly and to the right to have its free end normally in abutment with the post 13, biased theretoward by a spring 30.

Lifting of the barrier 14 from the dash line position as indicated in FIG. 1 will lower the member 17 to cause the right hand side of the finger 20 and the left hand side of the guard member 24 to straddle the pin 26 to rock the member 17 initially by its lower end to the right, and then drop downwardly along the pin 26 until the notch 22 comes down to the level of the pin 26, whereupon the member 17 will rock back under the influence of gravity to its normal vertically disposed position, in which position, the pin 26 is received within the notch 22. The vertical length of the notch 22 exceeds the diameter of the pin 26, so that there is freedom for the member 17 to move vertically of the pin 26 within a short range of travel.

From the position of the member 17 as indicated in FIG. 1, the member 17 is caused to swing to the right by its lower end by pulling the pin 26 to the right to cause it to come in contact with the guard 24, and cause the rocker 27 to be rocked by its lower end also to the right against the opposition of a spring 30, whereupon the barrier 14 may be dropped to the dash line position under the influence of gravity, the lever 15 assuming the dash line position as indicated in FIG. 1. Preferably a stop 31 is carried by the post 28 to be in the path of the rocker 27 between the pivot pin 29 and the actuating pin 26 to limit the rocking of the rocker accordingly. This stop 31 will prevent the finger 26 being shifted to the right beyond a position wherein it will be received between the face 21 and the guard 24 when the member 17 is again lowered, but most importantly, will prevent the over-stretching of the spring 30.

A rather long arm 32 which may be termed a primary arm is rockably mounted along the side of the bar 12 at a distance removed to the left from the post 28. This arm 32 normally drops by gravity to rest upon the lower stop 33 fixed to the side of the bar 12. The arm 32 has a right hand end finger 34 extending therefrom to be in the path of the notch 18. When the barrier 14 is in its up position, FIG. 1, the arm 32 is resting on the stop 33; the finger 34 is in the notch 18; and the pin 26 is in its notch 22. When the rocker 27 is rocked manually or by a coin controlled mechanism (not shown) to disengage the pin 26 from the notch 22, the latch member 17 is swung by the pin 26 striking the guard 24 to carry the latch member initially to the right, FIG. 1, and free the finger 34 from engagement in the notch 18, leaving the long arm 32 resting on the stop 33, and then allowing the weight of the barrier 14 to lift the latch member 17 to the dash line position, FIG. 1. The pin 26 is shown in FIG. 1 as being intermediate the top and bottom ends of the notch 22 for the sake of clarity in illustration only. Normally the bottom end of the notch 22 will bear against the pin 26.

Referring to FIGS. 3 and 4, there is an opening 37 in the floor 11 extending from the mounting bar 12. Transversely of the bar 12 and across this opening 37 are a plurality of spaced apart grille bars 38 fixed in positions. These bars 38 will support the weight of a car, the wheels of which will pass over the opening 37. A shaft 39a extends across the opening 37 at the right hand side thereof. This shaft 39a has fixed thereto a treadle generally designated by the numeral 39 provided with rectangular openings 40 therethrough to receive upper edges of the grille bars 38 so that when the treadle 39 is in its lowered position, the upper edges of the grille bars 38 are made available to carry the load of the vehicle traveling thereacross. This treadle 39 is provided with bars 41 spaced apart to define the openings through which the grille bar edges are received. A stop arm 42 is fixed to the shaft 39a to have a free end of the arm in the path of an abutment 43 carried in the present instance by the bar 12. This is a limit to upward swinging of the treadle 39. The treadle 39 is so fixed to the shaft 39a that it will have its free end toward the left hand side so that a vehicle approaching from the barrier 14 will have a front tire run against the uplifted treadle 39 to push it downwardly when the treadle is released as will be further explained. That is to say, the tires of the vehicle in traversing the floor 11 from the barrier 14, will always tend to rock the treadle 39 downwardly rather than hit a free upwardly presented edge.

A hold bar 44 is rockably attached by a pin 45 to the arm 32 to extend upwardly therefrom and be diagonally disposed leaning to the right as indicated in FIG. 1, when the barrier 14 is in the stop position. The upper end of this hold bar 44 carries bearings herein shown as two in number, one on each side. In the form herein shown, these bearings consist of ball bearings 46 and 47 having exposed peripheral portions in each instance. The hold bar 44 is biased to lean to the right in the diagonal position indicated in FIG. 1, herein shown as by means of a weight 48 affixed to the right hand side of the hold bar 44 disposed so as to have its outer under edge normally dropped by gravity onto the topside of the arm 32. The arm 32 carries an upwardly extending abutment 49 adjacent the hold bar 44, and serves to stop movement of the hold bar 44 to the left in a position slightly inclined in that direction from the vertical.

A bearing lift bar generally designated by the numeral 50 is fixed to the treadle shaft 39a. Normally this bar 50 is held in the position as indicated in FIG. 1 when the barrier is in the stop position by reason of the arm 42 resting on its abutment 43. In other words when this arm 42 is resting on the abutment 43, the bar 50 is rocked to its lowermost position which is the position when the treadle 39 is in its uppermost rocked position. The bar 50 carries a concave surface 51 on an uppermost part, and to the right hand side thereof is rockably attached to the bar 50 a lifter finger 52. This finger 52 is pivoted on the pin 53 carried by the bar 50, and has a tail end 54 which is rockable downwardly around against the inclined surface 55 of the bar 50 sloping downwardly to the right from the right hand end of another inclined surface 56, the inclination of which is less than that of the surface 55 whereby the finger 52 is normally dropped against the surface 56 under the influence of gravity, due to the fact that the major portion of the finger 52 is to the left of the pivot pin 53.

Now assuming that the finger 26 has been pulled to the right to allow the action of the mechanism above described in reference to the travel of the barrier 14, the barrier 14 drops as indicated by the dash lines to the position 14a, and the member 17 comes up to the dash line position 17a. The other mechanism to the left, FIG. 1, remains the same without shifting, with the treadle 39 rocked to its uppermost inclined position and held there by reason of the treadle overbalancing weight of the members 32, 48, 50, and 52. A vehicle (not shown) travels over the lowered barrier 14 by the front tire which proceeds over the floor 11 to come against the treadle 39. In so doing, the tire will press the treadle down until it is parallel and preferably even with the topside of the floor 11, and immediately following the passage of the tire beyond the treadle 39, the arm 32 will have been rocked to have brought a convex cam surface 35 extending upwardly from the finger 34 end of the arm 32 against the inclined surface 19 of the latch member 17; have pushed thereby the latch member finger 20 against the pin 26 against the yielding resistance of the spring 30; have carried the arm finger 34 up the latch member inclined surface 19; have snapped the finger 34 into the notch 18; and have the arm 32 come into that position shown in FIG. 2; interengaging with the member 17 by the finger 34 and lifting the bearing carrier member 44 preceded by rocking of the member 50 along with the down rocking of the treadle 39. In this upward rocking of the member 50, the concave face 51 is brought up under the bearing 46 in turn, through the member 44 lifting the arm 32 to bring the finger 34 up into the engagement in the notch 18. Now another action takes place in that sequence of movements of those parts, and that is the other bearing 47 comes up against a lug 57 which extends into the path of the bearing 47.

This lug 57 is fixed to a rockable post 58 which is pivotally mounted on the bar 12 to rock yieldingly to the left by reason of the pressure of the bearing 47 against the lug, this yielding movement being resisted by means of a compression spring 59 interposed between a fixed stop 60 and the left hand side of the post 58. The upper side, that is the topside, of the lug 57 is concave to give the hollow surface 61, and when the bearing 47 has travelled upwardly sufficiently, and against the right hand side of the lug 57, it will in effect snap over onto the topside of the lug 57 and drop down onto the surface 61, there being sufficient play of the member 34 in the notch 18 to permit the over-travel of the bearing to get to the topside of the lug and then drop back down onto the surface 61. The post 58 is limited in its rocking by coming into abutment with a stop 62 carried on the side of the bar 12, in the path of the rocking post 58.

A shaft 63 extends through the bearings 46 and 47 to be in the path from the underside of the lifting finger 52. The member 52 rests at all times across the shaft 63. The underside left hand surface of the lifting finger 52 is cut away to provide the shaft contacting face 64 which terminates at a wall 65 extending downwardly and serving as an abutment to come against the shaft 63. In the up position of the barrier 14, the lifting finger 52 will be resting on the upper right side portion of the shaft 63 with the wall 65 thereabove and somewhat to the left.

Following the placing of the bearing 47 on the surface 61 of the lug 57, the treadle 39 will be at rest and at an inclined position as shown in FIG. 2, having a slope less than its position as indicated in FIG. 1. It is to be remembered, that only the front wheel has traversed the treadle 39 up to this point. As the vehicle continues, and the rear wheel strikes the treadle 39, this treadle is pressed down again to be in substantial parallelism and in the same plane preferably as the top of the floor 11 so that the rear tire, as did the front tire, rides on across the grille bars 38 without the load being carried by the treadle itself. The rocking of the treadle 39 is merely for operational purposes and is not a load carrying member.

It is to be noted, that when the treadle 39 is in the less inclined position as indicated in FIG. 2, it is held there by reason of the lift bar 50 resting upon a stop 66 carried by the hold bar 44. The arm 32 of course is held upwardly as above indicated by reason of the finger 34 resting in the notch 18. In the travel of the hold bar 44 from the position indicated in FIG. 1, the tail 54 of the lifting finger 52 is initially resting on the surface 55, and then after the travel of the front tire over the treadle 39, the lifting finger 52 drops down to a limit bearing against the surface 56, to that position coinciding with the surface 64 resting on the shaft 63.

When the treadle 39 is rocked down the second time by the rear wheel of the vehicle, the wall 65 comes up against the shaft 63, to lift that shaft and the bearing 47 out of the concavity of the surface 61, and push it on over to the left to allow it to drop downwardly around under the lug 57 to a spaced relation over the top of the concave surface 51 of the lift bar 50, the shaft 63 bearing against the finger 52 under surface 67 and the weight 48 dropping to rest against the arm 32 as above described. This action allows the arm 32 to drop under influence of gravity, the end finger 34 remaining in the notch 18, and thereby lift the barrier 14 with this dropping of the arm 32, and place the entire mechanism in the next order of operation for an oncoming vehicle.

While I have herein shown and described my invention in the form now best known to me, it is obvious that modifications in that precise form may be employed without departing from the spirit of the invention beyond the limitations which may be imposed by the following claims.

I claim:

1. In a vehicle stop and go control signal device reset to a stop condition by passage of a vehicle moving in a path therepast, the combination of signal shifting means, and a two step means restoring the signal automatically to a stop indication by passage of a vehicle past the signal, said two step means comprising a shiftable primary arm pivotally mounted on the device; latch means releasably interengaging said arm and said signal means to place said signal means in a "go" indication; a hold bar shiftably carried by said arm; a bearing member carried by said bar; a post mounted adjacent said bar; a single treadle rockably mounted in the path of front and rear wheels of a vehicle passing said signal means; a movable hold bar operably connected to said treadle lift arm rocked by travel of said treadle; means on said bar lift arm lifting said bearing member into engagement with a portion of said post upon a front wheel down rocking of said treadle; a member carried by said lift arm releasing said bearing member from said engagement with said post upon rocking down of said treadle by said vehicle rear wheel, allowing said hold bar to drop with said primary arm and restore said signal means through said latch means to a "stop" signal indication.

2. The structure of claim 1 in which said primary arm is rockably supported by one end and engages said latch means by its opposite end; said latch means comprising a member rockably hanging from said signal means and having a notch receiving an end portion of said primary arm opposite end.

3. The structure of claim 2 in which there is a finger biased against said latch member and shiftable to move said latch means out of engagement with said primary arm when in a lowermost position; said signal means being biased to a "go" condition; the rocking of said primary arm to said lowermost position when in engagement with said latch means operating said signal means to a "stop" condition.

4. In a vehicle stop and go control the combination with a floor of a base member; a barrier; a barrier carrying lever pivotally supported intermediate its ends by said base member and normally rocking by an overbalanced barrier end portion to lift the other end; a latch bar rockably secured to and hanging downwardly from said other end; a rocker pivotally supported by said base below said one end and biased to extend by an end portion toward the up and down path of said latch bar; a guard on one side of said latch bar extending around and downwardly in spaced relation therefrom; said latch member having a notch therein at the upper end of and opposite said guard; a pin extending from said rocker; means biasing said rocker pin against said latch member; a long arm rockably carried by said base on a pivot spaced from an opposite side of said latch member from said guard side; said latch member having a notch in said opposite side; a finger on said arm normally engaged in said notch; a surface on said opposite side below said notch; said pin normally urging said latch bar into said finger-notch engagement; an abutment carried by said base limiting downward swinging of said bar; a treadle rockably supported to swing from a lower position approximately in the plane of said floor and to an upper vehicle intercepting position above the floor; a lift bar fixedly interconnected and rocking with said treadle swinging; a post carried by said base; a hold bar rockably carried by said long arm to extend upwardly therefrom; a bearing member carried by said bar in the path of said lift bar; a bearing supporting member on said post; said lift bar striking said bearing member and lifting it upwardly to be carried from said supporting member; a member projecting from said bearing member; a lifter finger rockably carried by said lift bar and normally bearing on the upper side of said projecting member; means biasing said hold bar toward said lifter finger; said lifter finger having an abutment on its side bearing on the projecting member and normally spaced therealong from that member; said barrier lever normally holding said barrier end portion above said floor by engagement of said pin in said notch under said guard; and said long bar finger maintaining that engagement while resting on its said abutment; said barrier lever end portion dropping the barrier upon release of said pin from its latch member notch by rocking said rocker to overcome its biasing means; said bearing lift bar with its attached lifter finger biasing said treadle to an uppermost position; travel of a front wheel of said vehicle over said treadle, lowering the treadle to lift said bearing member onto said supporting member and thereby shift to and hold said long arm in an upwardly rocked position and holding said treadle by said lifter finger abutment in an intermediate position between said floor and said treadle uppermost position, and travel of the vehicle rear wheel over said treadle removing said bearing from its supporting member allowing said treadle to rock to said uppermost position, releasing said long arm to drop by gravity and lower said latch means resetting it to the barrier up position.

5. In a vehicle stop and go control device reset to a stop condition by passage of a vehicle therepast, the combination of signal shifting means, and a two step means restoring the signal automatically to a stop indication by passage of a vehicle in a continuing direction past the signal, said two step means comprising a shiftable primary arm; latch means releasably interengaging said arm and said signal means to place said signal means in a "go" indication; a hold bar shiftably carried by said arm; a bearing member carried by said bar; a post mounted adjacent said bar; a single treadle rockably mounted in the path of front and rear wheels of a vehicle passing said signal means; a hold bar lift arm rocked by travel of said treadle; means on said bar lift arm lifting said bearing member into engagement with a portion of said post upon a front wheel down rocking of said treadle; a member carried by said lift arm releasing said bearing member from said engagement with said post upon rocking down of said treadle by said vehicle rear wheel, allowing said hold bar to drop with said primary arm and restore said signal means through said latch means to a "stop" signal indication; said primary arm rockably supporting by one end and engages said latch means by its opposite end; said latch means comprising a member rockably hanging from said signal means and having a notch receiving an end portion of said primary arm opposite end; a finger biased against said latch member and shiftable to move said latch means out of engagement with said primary arm when in a lowermost position; said signal means being biased to a "go" condition; the rocking of said primary arm to said lowermost position when in engagement with said latch means operating said signal means to a "stop" condition; said latch means rocking member extends by a surface below said notch riding against said primary arm opposite end as that arm is lifted when said bearing member is lifted into engagement with said post whereupon said primary arm opposite end enters said notch, and, upon subsequent dropping of the primary arm, remains in said notch.

6. In a vehicle stop and go control device reset to a stop condition by passage of a vehicle therepast, the combination of signal shifting means, and a two step means restoring the signal automatically to a stop indication by passage of a vehicle in a continuing direction past the signal, said two step means comprising a shiftable primary arm; latch means releasably interengaging said arm and said signal means to place said signal means in a "go" indication; a hold bar shiftably carried by said arm; a bearing member carried by said bar; a post mounted adjacent said bar; a single treadle rockably mounted in the path of front and rear wheels of a vehicle passing said signal means; a hold bar lift arm rocked by travel of said treadle; means on said bar lift arm lifting said bearing member into engagement with a portion of said post upon a front wheel down rocking of said treadle; a member carried by said lift arm releasing said bearing member from said engagement with said post upon rocking down of said treadle by said vehicle rear wheel, allowing said hold bar to drop with said primary arm and restore said signal means through said latch means to a "stop" signal indication; said post portion constituting an upwardly directed concave surface; said bearing member is circular and rotatably carried on said hold bar; said lift arm means comprising a surface engaging said bearing member to elevate the member to come to rest on said post surface in an initial upward swing of said lift arm, by depression of said treadle, and a finger carried by said lift arm pushing said bearing member off of said surface upon a second upward swing of said lift arm by a subsequent treadle depression, allowing said hold bar to drop along with said primary bar.

7. In a vehicle stop and go control device reset to a stop condition by passage of a vehicle therepast, the combination of signal shifting means, and a two step means restoring the signal automatically to a stop indication by passage of a vehicle in a continuing direction past the signal, said two step means comprising a shiftable primary arm; latch means releasably interengaging said arm and said signal means to place said signal means in a "go" indication; a hold bar shiftably carried by said arm; a bearing member carried by said bar; a post mounted adjacent said bar; a single treadle rockably mounted in the path of front and rear wheels of a vehicle passing said signal means; a hold bar lift arm rocked by travel of said treadle; means on said bar lift arm lifting said bearing member into engagement with a portion of said post upon a front wheel down rocking of said treadle; a member carried by said lift arm releasing said bearing member from said engagement with said post upon rocking down of said treadle by said vehicle rear wheel, allowing said hold bar to drop with said primary arm and restore said signal means through said latch means to a "stop" indication; said signal means comprising a rocker arm pivoted intermediate its ends; a stop indication on one of the rocker arm ends; said latch means comprising an engaging member rockably hanging from the other of said rocker arm ends, said engaging member having spaced apart abutments, and a tongue extending from said primary arm entering between said abutments permitting thereby up and down travel of the latch member with like travel of said primary arm, a second pair of spaced abutments on said engaging member, a shiftable pin biased to enter between the second abutments and hold said latching member against up and down travel and also hold the latching member tongue and said first abutments in engagement, a guard on said latch engaging member in the path of said finger when the finger is shifted from between said second abutments; said pin, upon striking said guard, swinging the latch member to carry said first abutments out of the path of said arm tongue and allow said rocker arm to drop said stop indicator.

8. In a vehicle stop and go control device reset to a stop condition by passage of a vehicle therepast, the combination of signal shifting means, and a two step means restoring the signal automatically to a stop indication by passage of a vehicle in a continuing direction past the signal, said two step means comprising a shiftable primary arm; latch means releasably interengaging said arm and said signal means to place said signal means in a "go" indication; a hold bar shiftably carried by said arm; a bearing member carried by said bar; a post mounted adjacent said bar; a single treadle rockably mounted in the path of front and rear wheels of a vehicle passing said signal means; a hold bar lift arm rocked by travel of said treadle; means on said bar lift arm lifting said bearing member into engagement with a portion of said post upon a front wheel down rocking of said treadle; a member carried by said lift arm releasing said bearing member from said engagement with said post upon rocking down of said treadle by said vehicle rear wheel, allowing said hold bar to drop with said primary arm and restore said signal means through said latch means to a "stop" signal indication; said post portion constituting an upwardly directed concave surface; said bearing member is circular and rotatably carried on said hold bar; said lift arm means comprising a surface engaging said bearing member to elevate the member to come to rest on said post surface in an initial upward swing of said lift arm, by depression of said treadle, and a finger carried by said lift arm pushing said bearing member off of said surface upon a second upward swing of said lift arm by a subsequent treadle depression, allowing said hold bar to drop along with said primary bar; wherein said post is pivoted to swing transversely of the travel of said lift arm and is yieldingly biased toward said lift arm, the post being contacted and rocked by said bearing, and, upon an upper limit of lifting; the post springing back by said biasing to bring said surface under the bearing member.

References Cited in the file of this patent
UNITED STATES PATENTS

| | | |
|---|---|---|
| 1,098,235 | Driscoll | May 26, 1914 |
| 1,791,997 | Benton | Feb. 10, 1931 |
| 2,528,790 | Scherer | Nov. 7, 1950 |
| 2,627,920 | Barlow | Feb. 10, 1953 |
| 2,735,202 | King | Feb. 21, 1956 |